Sept. 30, 1958 E. J. STOCKER 2,854,248
ANCHORAGE CLAMPS FOR VEHICLE SAFETY BELTS
Filed Aug. 23, 1955 2 Sheets-Sheet 1

INVENTOR.
ELMER J. STOCKER
BY
Wheeler, Wheeler & Wheeler
ATTORNEYS

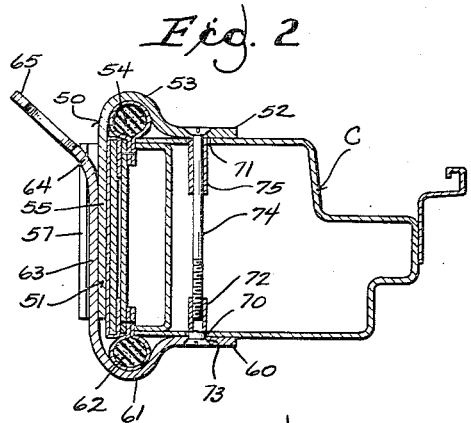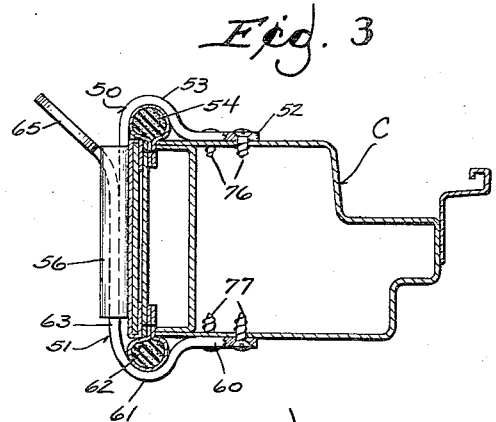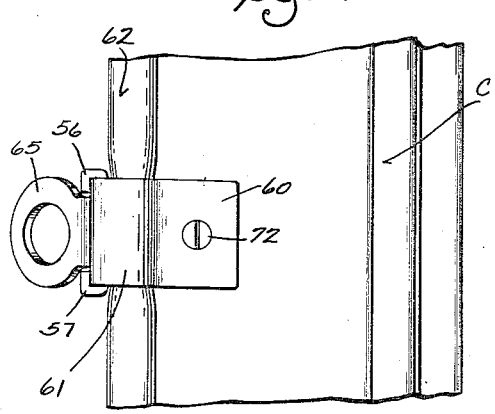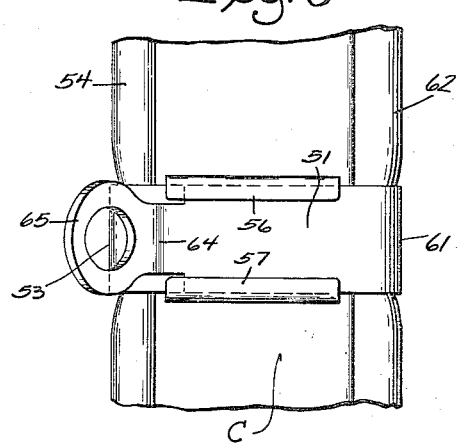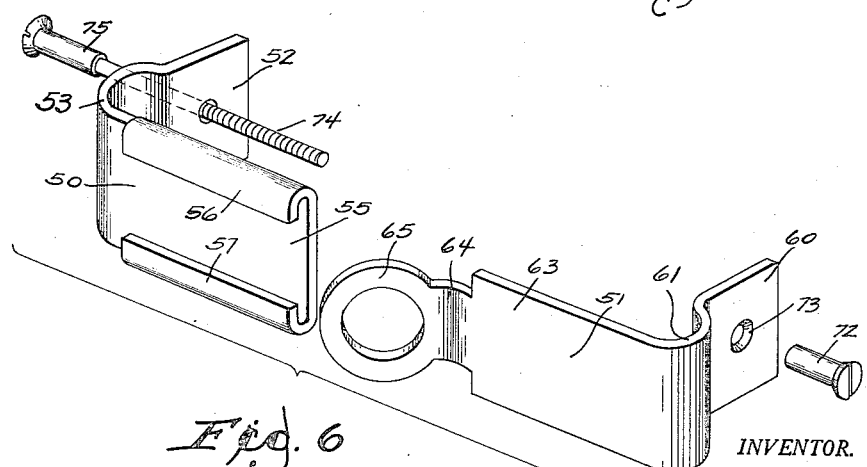
INVENTOR.
ELMER J. STOCKER
BY Wheeler, Wheeler & Wheeler
ATTORNEYS

United States Patent Office 2,854,248
Patented Sept. 30, 1958

2,854,248

ANCHORAGE CLAMPS FOR VEHICLE SAFETY BELTS

Elmer J. Stocker, Milwaukee, Wis.

Application August 23, 1955, Serial No. 530,064

3 Claims. (Cl. 280—150)

My invention relates to anchorage clamps for safety seat belts. This is a continuation in part of my application, filed September 21, 1951, under Serial No. 247,677 in the U. S. Patent Office, and now abandoned.

My invention has for its broad object the provision of a practical anchorage for attachment of a seat belt to the body post of a vehicle, and other features of my invention include the provision of an accessory clamp-like belt anchorage attachable to the body post of a vehicle so that persons of different sizes can have comfortable, safe seat belt application to the portion of their bodies in a truly safe position. And since this accessory must be applicable to existing and somewhat varied body posts, my invention provides positive anchorage to meet the major stresses which may be placed upon it.

My invention further includes the provision of anchorage clamps for safety seat belts involving the telescopic engagement of two principal structural members adapted to be slidably engaged with one another and secured to either side of a body post.

In the drawings:

Fig. 2 is a horizontal section through a center post and through a telescopically assembled anchorage clamp of my invention as mounted upon such center post.

Fig. 3 is a view of my telescopically assemblable anchorage device, but showing an alternative form of sheet metal screw attachment to the center post of a car body.

Fig. 4 is an elevation showing fragmentarily the center post shown in Fig. 2 with my telescopic anchorage secured thereto.

Fig. 5 is an elevation showing a fragmentary portion of the post shown in Fig. 2 as viewed from the interior of the car body.

Fig. 6 is a diagrammatic view of my telescopically assemblable anchorage device, the parts being in position for assembly.

Figure 1:
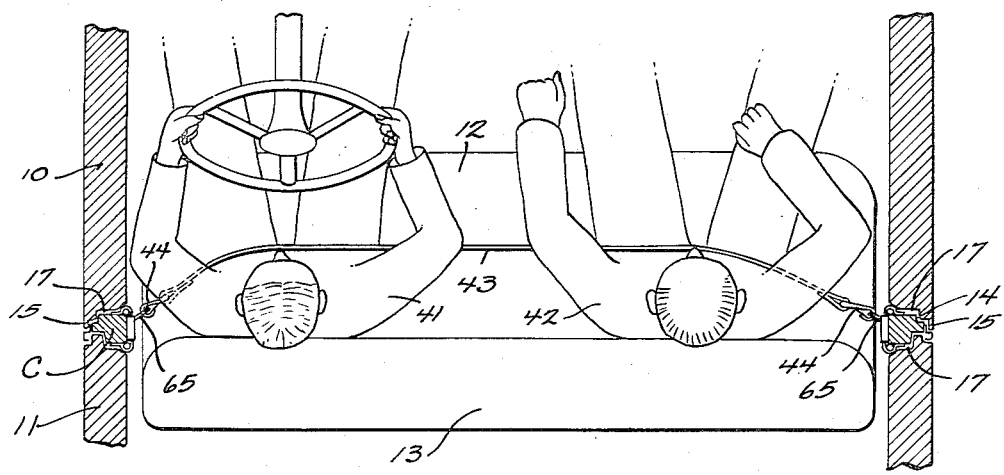
Fig. 1 is a fragmentary and somewhat diagrammatical view in plan of that portion of an automobile including the front seat area and showing two persons seated upon the front seat; the seat belt and seat belt anchorages embodying this invention being shown in their operating positions and the center posts and doors being shown in horizontal section.

In any vehicle having a "front" seat in normal position, spaced from a rear seat and forwardly of the usual floor area between the rear seat and a front seat, it is apparent that no satisfactory anchorage means heretofore has been available for the safety seat belt for the occupant of such front seat. Obviously the anchorage for the seat itself is inadequate in modern vehicles to sustain the major stresses imposed by the inertia of the seat itself in the event of sudden stoppage of the vehicle, as for instance in an accident. So attachment of a safety belt to the back of the front seat is not effective.

Research also indicates that safety belt attachment to the floor of the vehicle behind the front seat is also impractical since the point of anchorage is so low as to provide no control of the forward, hinge-like movement of the torso with reference to the legs of the occupant of a front seat in case of sudden stoppage of the vehicle.

The entire problem is complicated by the requirement for adaptability and easy attachment of a seat belt anchorage as an accessory for existing vehicles of somewhat differing design.

I have found that there is sufficient sameness of design however of the center body posts of four-door cars or sedans so that my anchorage provides an entirely adequate and satisfactorily strong anchorage for a safety seat belt for the front seat, and since my anchorage is an accessory having clamp characteristics, it is applicable to such center post at any adjusted position in respect to height and adaptability for users of differing sizes and safety requirements.

As shown in the drawings, the center post to which I refer is the body member C. It is the strong upright strut between the floor and the "top" of the vehicle and between the front and rear doors. It is the structural member against which the front doors 10 and rear doors 11 of the car close and latch, or in some cars it is the hinge support for one or both of the doors on one side of the vehicle.

As explained above, in the conventional four-door automobile and in some other models of modern automotive vehicles, a seat 12 for driver and passenger has a back 13 which extends across the interior of the vehicle body adjacent center post C. These center posts are provided in various shapes but include, as shown in the drawings, portions which have generally rectangular configuration in cross section and may have a laterally projecting panel 14 so that at either side thereof there is a rabbeted groove against which the flanges 15 of the respective doors may abut. A relatively wide space at 17 for a clearance between the doors and the post C provides ample space for my anchorage clamp now to be described.

In Fig. 1, I have shown my anchorage clamps in position upon their respective posts C of a conventional vehicle and I have shown a driver at 41 seated with his passenger 42 upon the seat 12. It will be noted that a safety belt 43 of suitable material such as webbing is positioned across the fronts of the torsos of the two individuals and at each end of the safety belt a snap hook 44 is used to attach the safety belt to the anchorage attachment 40.

Thus I have provided an accessory device for application to post C of any vehicle, and the user may clamp this anchorage at any position higher or lower on the posts C to support the safety belt 43 in a comfortable and effective position against the torso of the body or bodies of the occupants of seat 12.

My seat belt anchorage is shown in the drawings. This anchorage has two principal structural members 50 and 51 telescopically engageable as shown especially in Fig. 5, to embrace the center post C in position for attachment thereto.

Referring to Fig. 6, 50 includes plate 52 to be applied to the forward side of post C. This plate merges into a semicylindrical configuration at 53 designed to partially encompass the spongy bead 54 with which posts such as C are usually equipped. The semicylindrical portion 53 merges into a straight telescope plate 55, the margins of which are formed in channel shape at 56—57 to provide ways in which 51 is receivable. The other structural member 51 has a post engaging plate 60 adapted to be positioned against the post on the side opposite that which is engaged by the plate 52. This plate 60 merges into a semicylindrical portion 61 to encompass bead 62 opposite the bead 54, and the semicylindrical portion 61 merges into a telescoping plate 63 of such dimensions that it is receivable in the channel shaped margins 56—57 of member 50.

It is to the member 51 that the safety belt snap hook 44 or other belt attaching means is to be attached and for this purpose plate 63 is shaped with a neck 64 bent outwardly so as to extend between the free margins of the channel portions 56 and 57 of plate 55. The neck 64 is then developed outwardly into a lug or ring 65 to provide attaching means for the belt.

To fasten this form of clamp to post C, plates 52 and 60 are brought in face to face contact with the particular side of the post C to which they are to be pressed and held by the fastening means. Standard posts C for vehicles have, at the appropriate height for attachment of my clamp, a zone that is open for the extension through the post of a complete bolt and tubular nut as shown in Figs. 2 and 6. Merely by drilling a hole through the post at 70 and 71, it is possible to insert a tubular nut 72 through an opening at 73 in plate 60 and through bore 70 so that bolt 74 extended through plate 52 may be threadedly engaged with nut 72 (see Fig. 2). A sleeve at 75 provides adequate shear strength to prevent forceable tearing of the assembled clamp from the post C.

If a bolt 74 would encounter any of the interior equipment of post C, a pair of sheet metal screws as at 76—77 may be used with great safety and great strength (see Fig. 3).

With sheet steel of approximately 1/8" thickness, an extremely rugged clamp 50—51 will provide such strength in channels 56—57 and such rigidity of construction when assembled upon post C that no maximum pull upon 65 resulting from an accident will tear the clamp from its mounting upon the post, or dis-assemble the parts 50—51.

I claim:

1. An accessory attachment anchorage member including an L-shaped member for direct application against a postlike structural member, one leg of the L-shaped member being marginally shaped to provide spaced ways and the other leg having means for attachment to the post, and an eye equipped L-shaped member having one leg shaped for engagement and adjustment in said ways and another leg positioned to bear against the post whereby the post is embraced between said L-shaped members.

2. For attachment of a safety belt to a side wall element of a vehicle body, said element having approximately parallel faces, an accessory attachment anchorage assembly including two L-shaped members, one leg of one member being receivable against one of said faces and a leg of the other member being receivable against the other face with the other leg of each member providing a plate, the plate of one of said members being formed to provide spaced channel way portions and the plate of the other member being receivable in said ways for telescopic movement, said last mentioned plate having a neck developed into a lug to provide attaching means for the belt.

3. The anchorage assembly of claim 2 provided with means shaped to extend through said element of the vehicle body and connected to the L legs to prevent accidental movement of the assembly respecting said element.

References Cited in the file of this patent

UNITED STATES PATENTS

| | | |
|---|---|---|
| 827,260 | Nickles | July 31, 1906 |
| 1,973,011 | Morrison | Sept. 11, 1934 |
| 2,280,694 | Embree et al. | Apr. 21, 1942 |
| 2,665,143 | Rasmussen | Jan. 5, 1954 |
| 2,670,967 | Kean | Mar. 2, 1954 |